No. 852,662. PATENTED MAY 7, 1907.
A. DE HEMPTINNE.
PROCESS FOR ELIMINATING THE ODORS OF FISH OILS.
APPLICATION FILED MAR. 17, 1906.

WITNESSES:
George J. Schoenlank
W. H. Berrigan

INVENTOR,
ALEXANDRE DE HEMPTINNE.
By H. Van Oldenmeel
Attorney.

UNITED STATES PATENT OFFICE.

ALEXANDRE DE HEMPTINNE, OF GHENT, BELGIUM.

PROCESS FOR ELIMINATING THE ODORS OF FISH-OILS.

No. 852,662.  Specification of Letters Patent.  Patented May 7, 1907.

Application filed March 17, 1906. Serial No. 306,517.

*To all whom it may concern:*

Be it known that I, ALEXANDRE DE HEMPTINNE, a subject to the King of Belgium, and a resident of 51 Rue de la Vallée, Ghent, Belgium, university professor, have invented a certain new and useful Process for Eliminating the Odor of Fish-Oil, of which the following is a specification.

The process which forms the object of the present invention is derived from the process of treating oleic acid described in U. S. A. Patent No. 797112 of Feb. 7—1905. It is, in a manner, the special application of the same process to the treatment of a certain substance, namely fish-oil, for the purpose of eliminating the characteristic and disagreeable odor of that oil. The process also has the advantage that it makes the oil thicker.

The process consists in submitting fish-oil to the action of the silent electric discharge in an atmosphere of hydrogen. The hydrogen is fixed by the oil and after a sufficiently prolonged action of the silent discharge, the characteristic odor is gradually modified and disappears. At the same time, the oil becomes thicker. The latter fact is due not only to the fixation of the hydrogen, but also to a conversion of the oil under the influence of the silent discharge. The elimination of the odor of fish oil may however be effected in any gaseous atmosphere whatever: (1) because the oil is modified by the action of the silent discharge, independently of the action of the hydrogen; the presence of hydrogen has thus a favorable effect, without being quite necessary; (2) because the silent discharge always decomposes a few molecules of the oil, so that more or less hydrogen is evolved which is again fixed by the oil; in this way, even when operating with any gas whatever, there is still an action with hydrogen. Moreover, analysis has shown that after some time, when operating with air for instance, the gaseous mixture was composed as follows: 10% of carbon dioxid, 20% of hydrogen and 70% of nitrogen. The conclusion is that the elimination of the odor of fish oil may be effected in any atmosphere whatever; but it is effected more rapidly and above all more efficiently in an atmosphere of hydrogen, in the way that the product, when worked upon, when saponified for instance, shows never more its odor.

Figure 1:
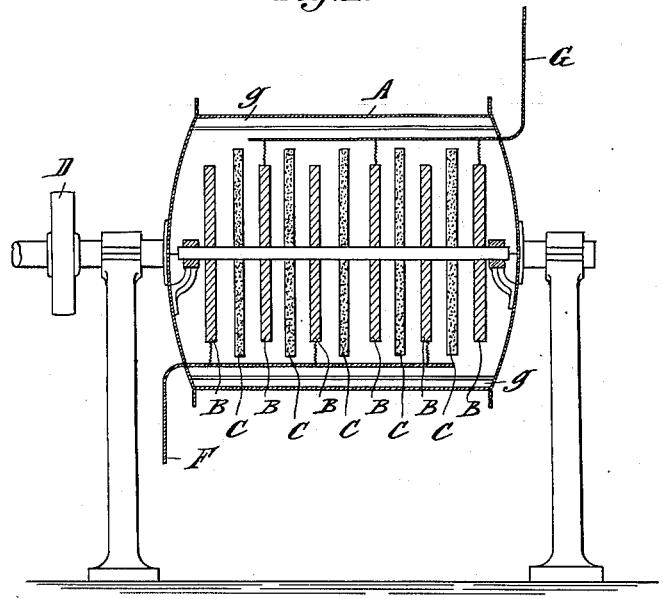
Figure 2:
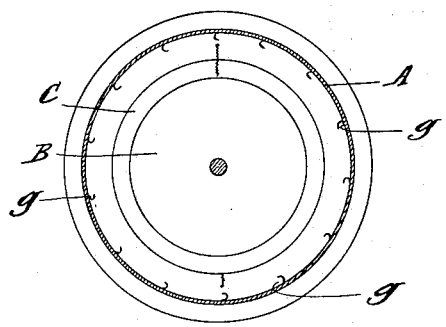

The most advantageous conditions for the change may be described with reference to the accompanying drawings, wherein Figure 1 is a longitudinal section and Fig. 2 a transverse section of a suitable apparatus.

A certain quantity of the oil is introduced into a cylinder A in which are arranged on a shaft a series of parallel plates, alternately of metal B and of glass, or other insulating material C. These plates are several millimeters distant from each other. The metal plates of odd numbers in the series are connected together and with one of the poles of a source of electricity by a wire F; similarly, the plates of even numbers are connected together and with the other pole by a wire G.

The cylinder is rotated by means of a pulley D and owing to a number of gutters $g$ fixed to the interior of its wall, the oil is continually sprinkled over the upper part of the plates and thus forms on them a thin and mobile layer. The cylinder being filled with hydrogen, for instance, the silent electric discharge is caused to pass. The gas is fixed by the oil and gradually removes its odor. From time to time the apparatus is stopped to introduce a fresh quantity of hydrogen corresponding with the gas that has been fixed. The apparatus is provided with the cocks necessary for the introduction of gas and for the withdrawal of the oil.

The process may evidently be conducted under slightly different conditions. For example the insulating plates may be in contact with the metal plates; or the sprinkling device may be modified, a thin, mobile layer of oil being produced, for example, on a system of fixed plates by sprinkling the upper part thereof.

Having thus described the nature of my said invention and the best means I know of carrying the same into practical effect, I claim:—

1. A process for eliminating the odor of fish oil, which consists in subjecting the oil to the action of the silent electric discharge in a gaseous atmosphere.

2. A process for eliminating the odor of fish oil which consists in subjecting the oil to the action of the silent electric discharge in an atmosphere of hydrogen.

In testimony whereof I have hereunto set my hand in presence of two witnesses.

ALEXANDRE DE HEMPTINNE.

Witnesses:
 ED. CHIRIONEL,
 GREGORY PHELAN.